US008672574B2

(12) United States Patent
Cavallere et al.

(10) Patent No.: US 8,672,574 B2
(45) Date of Patent: Mar. 18, 2014

(54) STRUCTURAL CONNECTING ROD MADE OF A COMPOSITE AND PROCESS FOR PRODUCING SUCH A CONNECTING ROD

(75) Inventors: Frederick Cavallere, Montigny-le-Bretonneux (FR); Maurice Guitton, Nova Scotia (CA); Olivier Blanc, Rosemere (CA); Claude Baril, Laval (CA)

(73) Assignees: European Aeronautic Defence and Square Company EADS France, Paris (FR); Composite Atlantic Limited, Nova Scotia (CA)

( * ) Notice: Subject to any disclaimer, the term of this patent is extended or adjusted under 35 U.S.C. 154(b) by 244 days.

(21) Appl. No.: 12/666,517

(22) PCT Filed: Jun. 27, 2008

(86) PCT No.: PCT/EP2008/058325
§ 371 (c)(1),
(2), (4) Date: May 27, 2010

(87) PCT Pub. No.: WO2009/000925
PCT Pub. Date: Dec. 31, 2008

(65) Prior Publication Data
US 2010/0278586 A1    Nov. 4, 2010

(30) Foreign Application Priority Data

Jun. 28, 2007  (FR) ...................................... 07 04656

(51) Int. Cl.
*F16C 11/00*    (2006.01)
(52) U.S. Cl.
USPC .............................................. 403/79; 74/588

(58) Field of Classification Search
USPC .............. 403/67, 72, 79, 344; 74/579 R, 588, 74/579 F; 280/93.507, 93.51
See application file for complete search history.

(56) References Cited

U.S. PATENT DOCUMENTS 1,947,278 A * 2/1934 Schaefer ..................... 74/579 R
(Continued)

FOREIGN PATENT DOCUMENTS

FR    2654483    5/1991
FR    2705610    12/1994

OTHER PUBLICATIONS

International Search Report dated Sep. 17, 2008.

*Primary Examiner* — Michael P Ferguson
(74) *Attorney, Agent, or Firm* — RatnerPrestia

(57) ABSTRACT

A connecting rod is composed of two or more assembled shells made of a composite, open over the entire length of the connecting rod. The shells incorporate clevis joints for introducing stress at each of their ends. The shells are produced separately then assembled together to form a sealed section. Each shell is made from a material preimpregnated with long fibres. The production of each shell is simplified due to the overall shape of the shell as a simple curve, thus a shell may be produced industrially, for example, by thermoforming a flat composite preform. The two shells are assembled by simultaneous polymerization of the shells, by bonding, by welding, by riveting or any other assembly process or combination of assembly processes that are compatible with one another. The structural composite connecting rod obtained has very good mechanical properties, especially in compression, with a simple and economic production process.

12 Claims, 4 Drawing Sheets

(56) References Cited

U.S. PATENT DOCUMENTS

| | | | |
|---|---|---|---|
| 3,007,713 A * | 11/1961 | Schilberg | 74/588 |
| 4,292,368 A * | 9/1981 | Mialon | 428/158 |
| 4,458,555 A * | 7/1984 | Holtzberg et al. | 74/579 E |
| 5,695,213 A * | 12/1997 | Nakamura et al. | 74/588 |
| 6,161,451 A * | 12/2000 | Gleason, II | 74/579 R |
| 7,704,429 B2 * | 4/2010 | Dunleavy | 264/258 |
| 7,722,280 B2 * | 5/2010 | Hofmann | 403/344 |
| 2003/0184075 A1* | 10/2003 | Freeman et al. | 280/797 |
| 2007/0176406 A1* | 8/2007 | Ruehl | 280/785 |

* cited by examiner

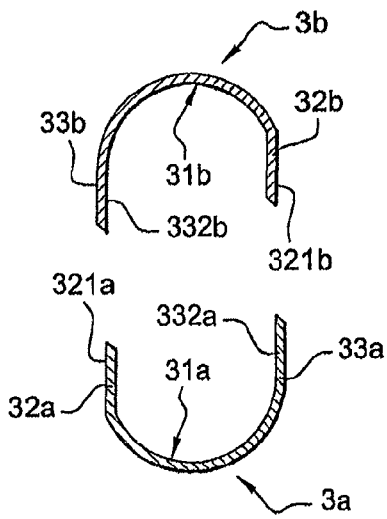
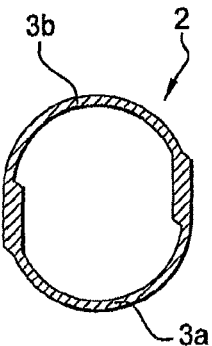
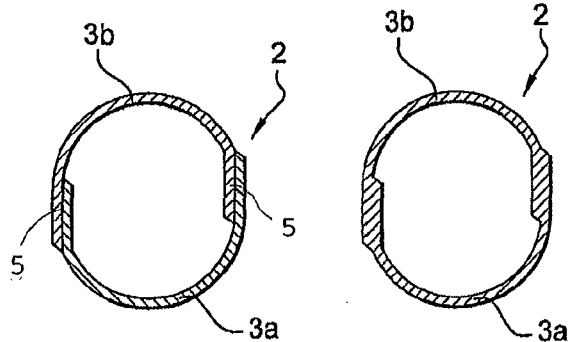
Fig. 4a    Fig. 4b    Fig. 4c
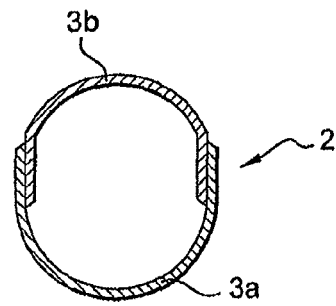
Fig. 6
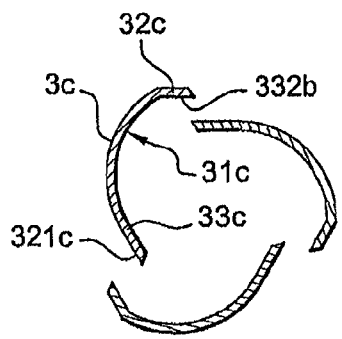
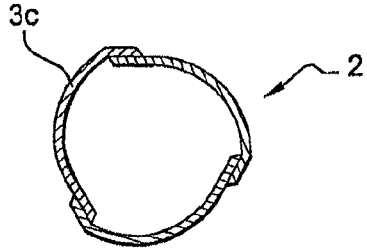
Fig. 7a    Fig. 7b

STRUCTURAL CONNECTING ROD MADE OF A COMPOSITE AND PROCESS FOR PRODUCING SUCH A CONNECTING ROD

This application claims priority of PCT International Application No. PCT/EP2008/058235 filed on Jun. 27, 2008. The contents of which are incorporated herein by reference.

FIELD OF THE INVENTION

The present invention relates to the field of structural parts made of composite material.

BACKGROUND

More particularly, the invention relates to a structural connecting rod made of composite and its method of manufacture, such as the structural connecting rods used in the production of aeronautical structures because of their favorable structural resistance to weight balance.

A structural connecting rod is an element of elongate form intended to take up traction and/or compression forces along a main axis of the connecting rod that corresponds to the direction in which the connecting rod is elongated.

More often than not, a connecting rod comprises at its ends clevis joints for taking up the forces, preferably adapted to transmit the forces along the axis of the connecting rod and to avoid generating forces that could bring about a deflection of the connecting rod, a deflection to which it is not adapted.

FIG. 1 represents a conventional connecting rod.

The connecting rod 1 comprises a central portion 10, the body of the connecting rod, substantially cylindrical, of the section that is more often than not circular, and of axis 14.

At each of its ends, the connecting rod comprises a zone 11a, 11b in which the external section of the connecting rod decreases progressively from the central portion 10 toward the end of the connecting rod. These end zones 11a, 11b are then designated as swagings.

At the end of each swaging, fixing elements 12a, 12b, for example clevis joints fitted with ball joints, are added and joined to the connecting rod for the connecting rod to be able to be assembled with a structure in whose strength it is required to participate.

The connecting rod is designed according to the forces to be transmitted and the central and generally hollow portion, as illustrated in the partial cutaway portion of the connecting rod in FIG. 1, and in the section of said figure, in order to distribute the resistant material of the connecting rod at the periphery of the body of the latter so that the connecting rod has a good resistance to buckling phenomena when the connecting rod is subjected to compression forces, without compromising the weight of the connecting rod.

The wall 13 of the central portion of the connecting rod 1 is produced, for at least aeronautical applications, more often than not using a light alloy based on aluminum or composite comprising long fibers, for example glass, Kevlar® or carbon fibers, held in a matrix of hardened organic resin, for example an epoxy resin.

These days, composites are being increasingly used because of a certain number of advantages:
- favorable weight balance for a given resistance;
- possibility of favoring the orientation of the fibers to take account of the preferred direction of the forces to be transmitted;
- better fatigue behavior than metal.

Various methods are known for producing such connecting rods in composite, either by methods using fibers pre-impregnated with resin before they are shaped, or by methods using fibers that are dry and then impregnated after they have been shaped during a resin transfer step following a method known as RTM.

In order to produce the composite part of the connecting rod, at least the body and the swagings, and possibly the end clevis joints, it is necessary to have a core or mandrel that is rigid enough to deposit and maintain the fibers, pre-impregnated or not, with the desired form until the resin of the composite has hardened, generally by polymerization during a hardening thermal cure.

When the resin has hardened, that is to say when the composite has reached a sufficient rigidity with respect to the desired resistance, it is generally preferred to remove the core which is of no further use and that can represent a not-inconsiderable weight or present physico-chemical characteristics, for example the release of fumes in case of fire, that are incompatible with the desired use of the connecting rod.

Because of its form, it is generally not easy to extract the core from the connecting rod.

The core must therefore be designed to allow it to be extracted, either by deformation or by destruction.

The cores that can be extracted by deformation are generally produced using elastomer, in one or more solid or hollow portions. Such cores have the advantage of being able to be used several times but their use remains complex for parts that have to be produced in relatively large quantities and they require particular precautions to obtain the form and the dimensions of the connecting rod because of their natural lack of rigidity.

The cores that are destroyed in order to be extracted are, for example, cores that can be chemically dissolved or melted by raising the material used to produce said core above a melting point. Such cores can be produced with well-controlled dimensions but they are often heavy and fragile to use and, by design, they can be used only once to produce a connecting rod.

The French patent published under the number 2705610, also corresponding to the U.S. Pat. No. 5,428,896, describes the production of a connecting rod using a single-usage core around which is produced a connecting rod of composite by filament winding of a pre-impregnated fiber.

After the composite has hardened, the core is dissolved in a solvent.

Such a method of producing a connecting rod, in addition to the problems intrinsic to the production, the handling and the elimination of the core, stems from the fact that the fibers must be deposited with certain angles relative to the axis of the connecting rod during the winding operation and that, because of these angles to be observed, it is not possible to orient fibers in the most theoretically optimal manner, that is to say parallel to the axis of the connecting rod.

SUMMARY OF THE INVENTION

There is therefore an essential interest in defining a connecting rod structure and a method of producing connecting rods in composite that are simplified while giving connecting rods good mechanical performance characteristics and at reduced cost.

For this, the invention proposes a structural connecting rod, that is to say a connecting rod of elongate form along an axis, able to withstand traction and compression forces oriented in the direction of the axis, comprising a hollow central zone, called body, of sealed straight section relative to the axis, produced mainly using a composite comprising fibers held in a hardened resin. The body is situated between a first end, comprising first means of fixing the connecting rod to a structure, and a second end, comprising second means of fixing the connecting rod to a structure.

The structural connecting rod comprises, at least for a structural portion of the body, at least two assembled shells. Each shell:

extends in the direction of the axis over a length at least equal to a length of the body of the connecting rod;

has a straight section relative to the open axis determining a concave internal face and a convex external face, on a face opposite to the concave internal face;

comprises a first bearing surface, on one face of the shell, at the level of a first extension of an edge of the shell;

comprises a second bearing surface, on one face of the shell, at the level of a second extension of an edge of the shell, the second extension being opposite to the first extension over a straight section of the shell.

Furthermore, each shell of a connecting rod is assembled with an adjacent shell so that the first bearing surface of a shell is bearing on the second bearing surface of the adjacent shell, the two or more assembled shells forming the body of the connecting rod and creating a sealed straight section which, among other things, ensures the structural stability of the connecting rod in response to the compression and buckling forces.

In order to obtain a connecting rod with relatively uniform structural characteristics, preferably the first bearing surface of each shell is an external bearing surface situated on the external face of the shell concerned and the second bearing surface of each shell is an internal bearing surface situated on the internal face of the shell concerned.

To avoid assembly operations and obtain a connecting rod with high integrity, advantageously one, two or more shells each comprise one or more clevis joints made of composite joined to said shell.

Preferably, for a better resistance of the assembled connecting rod, one or more clevis joints of the connecting rod are obtained by the assembly of at least two clevis joints joined to different shells.

In a particularly advantageous embodiment, the structural connecting rod comprises identical shells, production details apart.

In a preferred embodiment of the structural connecting rod because of its relative simplicity and its structural qualities, the connecting rod comprises two substantially identical shells, each shell having two clevis joints at each end and each clevis joint of a shell cooperating with a clevis joint of the other shell to form a clevis joint of the connecting rod.

The structural connecting rod made of composite is produced with shells in which the resin of the composite is a so-called thermosetting resin, that is to say one that acquires its mechanical properties during a baking operation, or indeed a so-called thermoplastic resin, that is to say one that is able to be deformed above a certain temperature and recover its mechanical properties after a cooling phase.

In the structural connecting rod, the shells are held assembled either by a simultaneous polymerization of the resin (co-bake) of the shells when this simultaneous polymerization is possible, or by gluing, or by welding, or even by mechanical fixing elements such as rivets.

The invention also relates to a particularly advantageous method of producing such a connecting rod which makes it possible to avoid the production of a sealed form in a single step and easily apply the known techniques to produce open forms for the shells of the connecting rod.

Thus, the method of producing a structural connecting rod conforming to the connecting rod according to the invention comprises a step for producing at least two shells:

having an extension in the direction of the axis over a length at least equal to a length of the body of the connecting rod;

presenting a straight section relative to the open axis determining a concave internal face and a convex external face, on a face opposite to the concave internal face;

comprising a first bearing surface, on one face of the shell, at the level of the first extension of an edge of the shell;

comprising a second bearing surface, on one face of the shell, at the level of a second extension of an edge of the shell, the second extension being opposite to the first extension over a straight section of the shell;

and a step for assembly of at least two shells, during which a shell is assembled with an adjacent shell so that its first bearing surface is bearing on the second bearing surface of the adjacent shell, so that the two or more assembled shells form the body of the connecting rod and create a sealed straight section.

According to a first implementation of the method, for the shell production step, the shells are produced with pre-impregnated fibers deposited on a form corresponding to the form of the shell to be produced, and the resin is not polymerized before the shells are assembled.

According to a second implementation of the method, for the shell production step, the shells are produced by polymerization fibers pre-impregnated with a resin that hardens by polymerization deposited on a form corresponding to the form of the shell to be produced.

In another way of implementing said second method, for the shell production step, the shells are produced by polymerization of a resin that hardens by polymerization after having been transferred into a preform made of dry fibers deposited in a mold.

According to a third implementation of the method, for the shell production step, a flat plate is produced and cut into wide strips (blanks). These blanks are formed or thermoformed on a mandrel to give them the form of the shells. The resin can be a thermosetting or thermo-plastic resin.

According to a first implementation of the method, for the shell assembly step, applicable when the shells are produced in a composite using a resin that hardens by polymerization, the shells are assembled by a method comprising a phase of simultaneous polymerization of the shells having bearing surfaces in contact.

According to a second implementation of the method, for the shell assembly step, applicable when the shells are produced in a composite having thermoplastic proper-ties, the shells are assembled by a thermoplastic welding method.

According to other implementations of the method for the shell production step, the shells are also assembled by gluing or by fitting mechanical fixings, the various assembly methods being able to be combined for a better resistance of the assembly when the methods are compatible with each other and with the composite of the shells.

BRIEF DESCRIPTION OF THE DRAWINGS

The detailed description of an embodiment of the invention and of alternatives to this embodiment is given with reference to the drawings which represent:

FIG. 4a: a straight section of the shells, before assembly, of a connecting rod formed by two shells according to the invention;

FIG. 4b: a straight section of the shells of FIG. 4a after assembly by gluing;

FIG. 4c: a straight section of the shells of FIG. 4a after assembly by simultaneous baking;

FIG. 6: a straight section of shells assembled according to an alternative embodiment of the invention;

FIG. 7a and FIG. 7b: straight sections before and after assembly of the shells according to one embodiment of the invention of a connecting rod formed with three shells.

DETAILED DESCRIPTION

Figure 1:
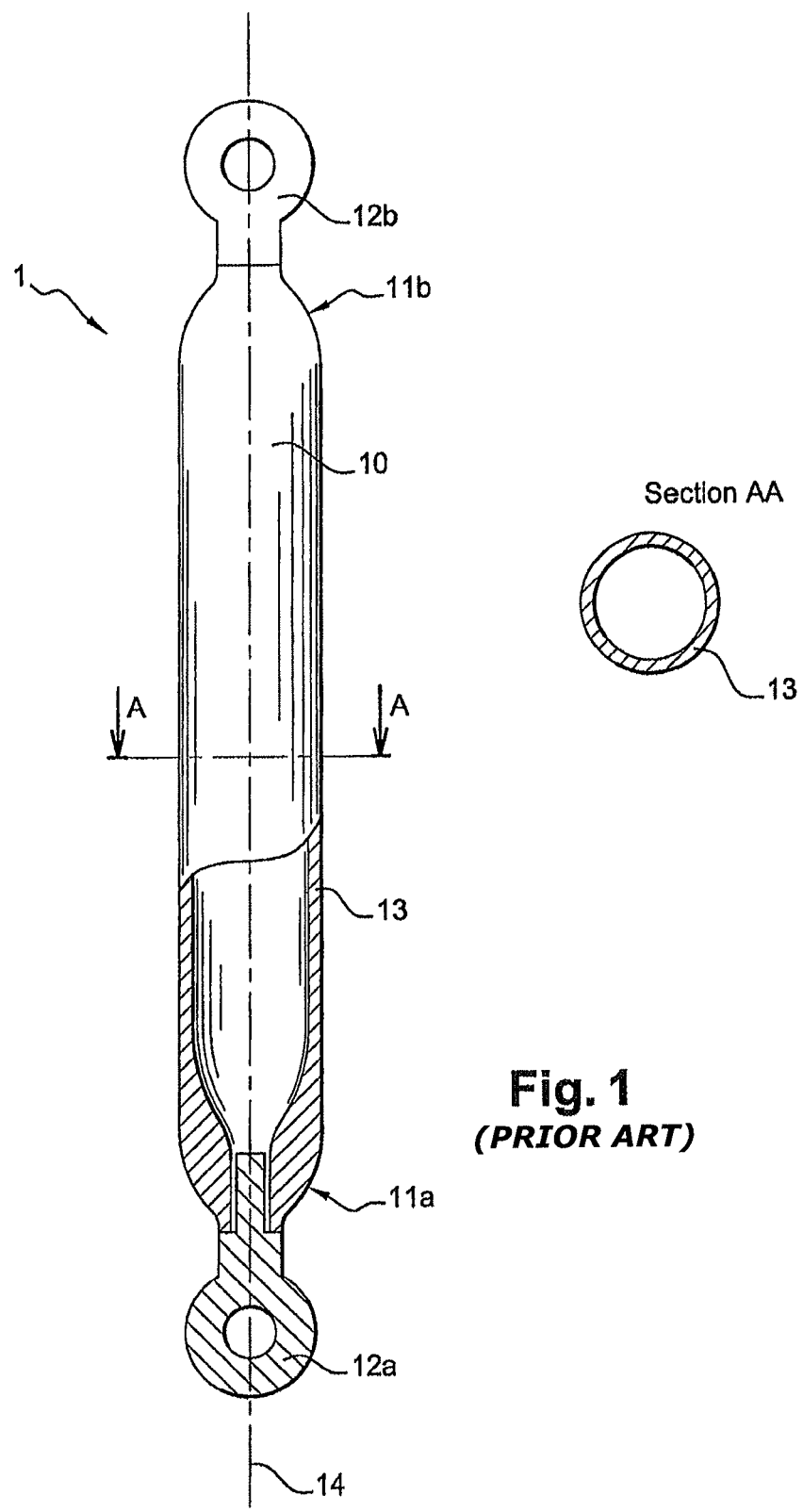
FIG. 1: already mentioned, an exemplary structural connecting rod according to the prior art.
Figures 2, 3A, 3B:
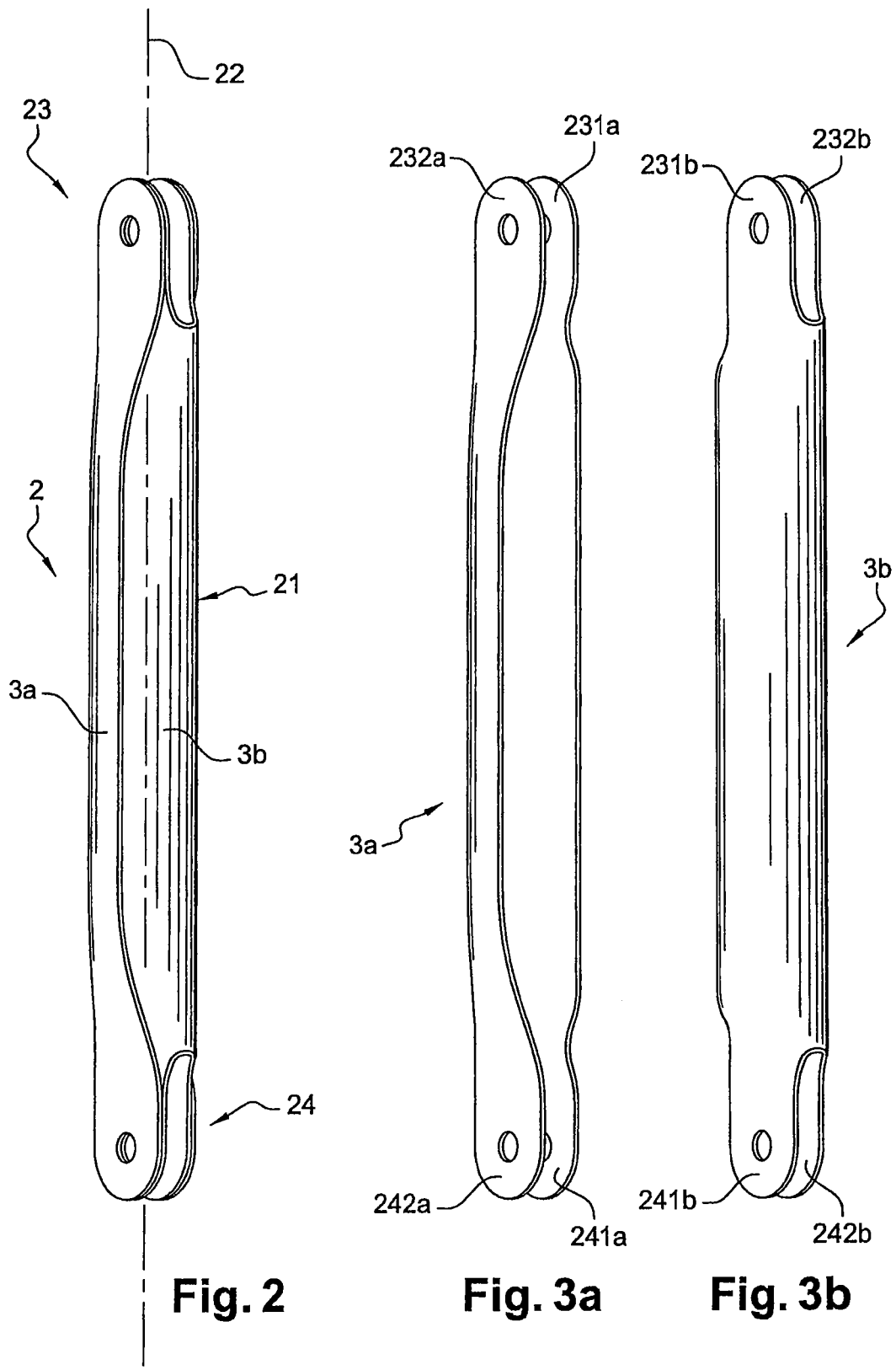
FIG. 2: an overall view in perspective of a connecting rod according to the invention.
FIG. 3a and FIG. 3b: perspective views of two shells forming the connecting rod of FIG. 2, before assembly.

A structural connecting rod 2 in composite according to the invention, illustrated in FIG. 2, comprises:
- a substantially cylindrical central zone 21, whose generatrix are parallel to an axis 22 oriented according to a dimension of the connecting rod 2 corresponding to its longest length, hollow and of sealed straight section relative to the axis 22;
- a first end 23 comprising first means of fixing the connecting rod to a structure (not represented);
- a second end 24 also comprising second means of fixing the connecting rod to a structure.

The first fixing means and the second fixing means correspond, in the exemplary structural connecting rod described, to two double clevis joints per end of said connecting rod, each clevis joint having a preferably substantially flat portion in composite provided with a hole able to allow a fixing element to be fitted (not represented).

The connecting rod 2 comprises a first shell 3a and a second shell 3b, shown separate in FIG. 3a and in FIG. 3b, which are assembled to form the structural part of said connecting rod presented in FIG. 2.

Each shell 3a, 3b substantially corresponds to a half-connecting rod which would be obtained by cutting the connecting rod 2 into two portions in the direction of the length of said connecting rod in the direction of its axis 22, but with dimensions of their straight sections relative to the axis 22 substantially augmented at the level of the edges of said sections so that said shells present surfaces that overlap when the shells are placed to form the connecting rod 2.

In practice, each shell 3a, 3b presents a straight section, perpendicular to the axis 22 of the connecting rod 2 of which said shell is a part, whose form is open and is substantially U-shaped, as illustrated in FIG. 4a, determining a concave internal face 31a, respectively 31b, whose curvature is in accordance with a radius of the connecting rod 2 and two extensions 32a, 33a, respectively 32b, 33b, which are developed on the edges of the section of the shell, in directions parallel to each other.

Each shell also comprises a convex external face opposite to the concave internal face which essentially corresponds to the external surface of the connecting rod 2 when the two shells are assembled to form said connecting rod.

The two shells 3a, 3b are assembled with the concave face 31a of the first shell 3a facing the concave face 31b of the second shell 3b so that sides of the extensions 32a, 33a which extend the first shell 3a on its edges are bearing on the sides of the extensions 32b, 33b which extend the second shell 3b on its edges.

More specifically, an external bearing surface 321a of one, 32a, of the two extensions of the first shell 3a, that is to say the bearing surface that is situated on the side opposite to the concave side 31a of said first shell, is in contact when the shells are assembled with an internal bearing surface 332b of one, 33b, of the extension of the second shell 3b, that is to say a bearing surface that is situated on the concave side 31b of said second shell, an extension that is on the same side of the connecting rod 2 as the extension 32a concerned of the first shell.

Similarly, an internal bearing surface 332a of the other extension 33a of the first shell 3a is in contact with an external bearing surface 321b of the other extension 32b of the second shell 3b.

The bearing surfaces are advantageously flat surfaces, which makes it possible to easily position the shells and allow the possibility of relative movement between the shells able to facilitate a repositioning during assembly.

However, the bearing surfaces can be of any forms provided that the surfaces in contact when the connecting rod is produced by the assembly of the shells have forms that are able to cooperate to allow the assembly and with sufficient overlaps to guarantee the resistance of the assembly.

This relative positioning of the two shells 3a, 3b is possible through the fact that said two shells have identical sections or at least that a distance separating the internal surface 332a, 332b, of an extension 33a, respectively 33b, of a shell 3a, respectively 3b, from the external surface 321a, respectively 321b, of the other extension 32a, respectively 32b, of said shell 3a, respectively 3b, is identical for the two shells 3a and 3b assembled to form the connecting rod 2 whose current straight section is represented in FIG. 4b or 4c.

The contact between the faces of the two shells 3a, 3b, as has just been described, is advantageously produced over the entire length of the connecting rod 2 so that said two shells can be joined over the maximum of length of the connecting rod produced by the assembly of the shells.

Preferably, to obtain a connecting rod with characteristics that are as uniform as possible, and to simplify their manufacture, the two shells are identical.

Advantageously, each shell 3a, 3b comprises, as illustrated in FIGS. 3a, 3b, at each of its ends, two clevis joints 231a, 232a, 241a, 242a, respectively 231b, 232b, 241b, 242b, so that each clevis joint of a shell has a surface in contact with a surface of a clevis joint of the other shell when the two shells are assembled.

Figure 5C:
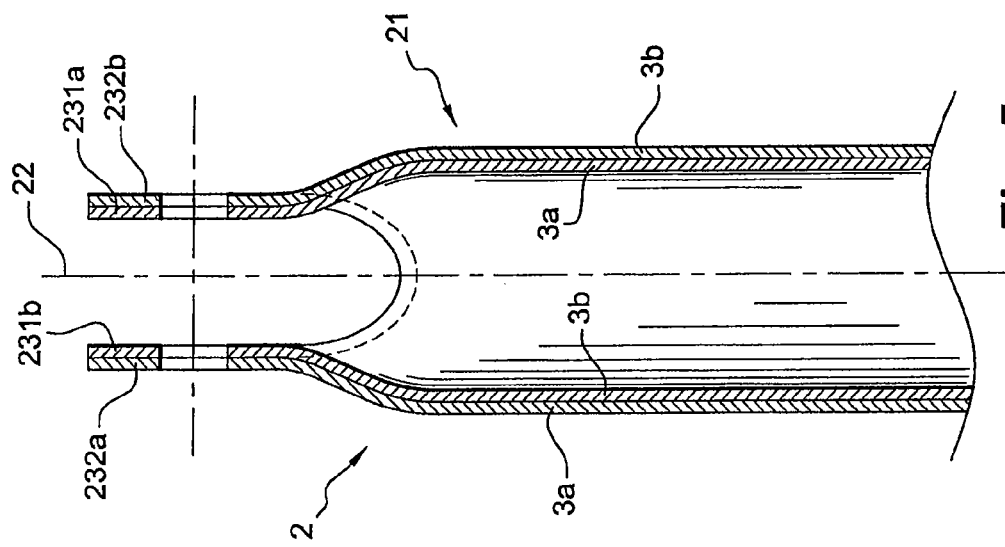
FIG. 5c: an axial cross section corresponding to the view of FIG. 5b of a portion of the connecting rod according to the invention.
Figure 5B:
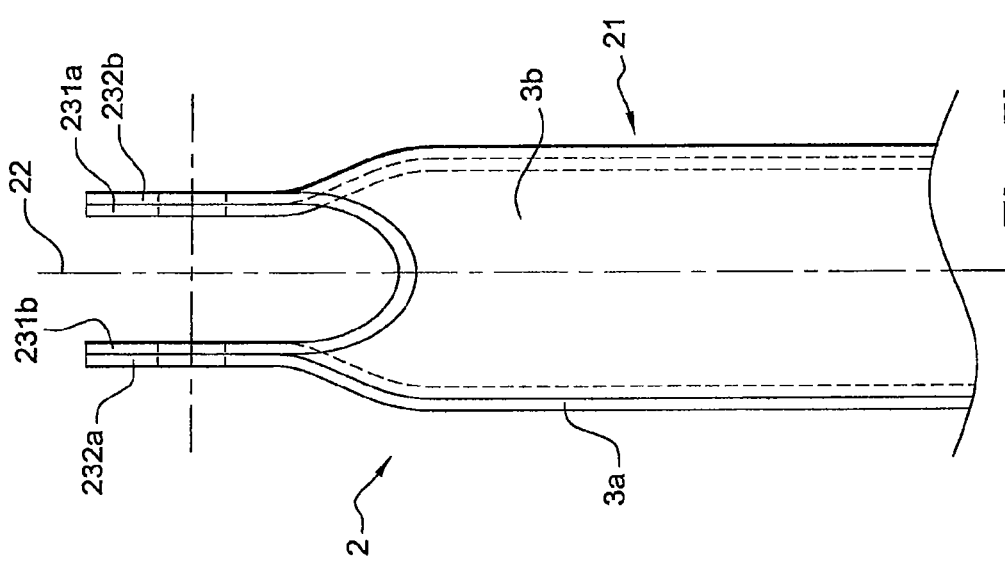
FIG. 5b: a front view of a portion of the connecting rod according to the invention.
Figure 5A:
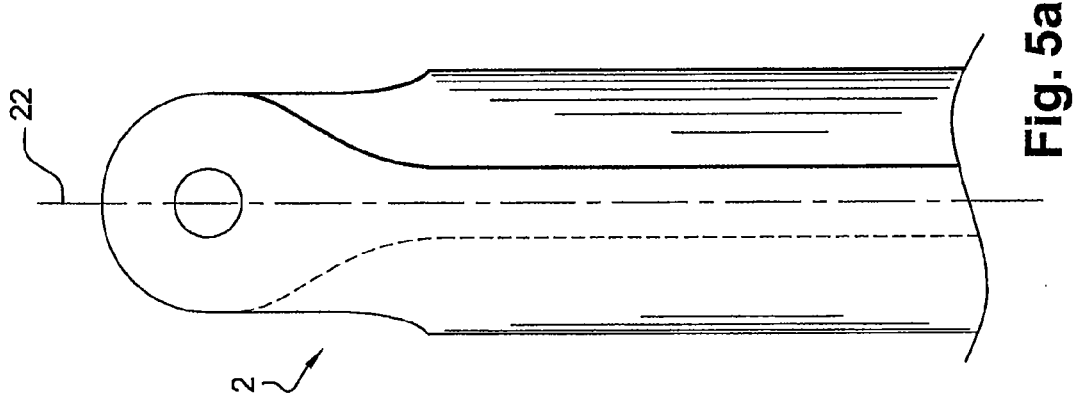
FIG. 5a: a profile view of a portion of a connecting rod according to the invention.

According to this embodiment, as shown for one end of the connecting rod 2 in FIG. 5b and the cross section of FIG. 5c, each clevis joint of the connecting rod 2 corresponds to a combination of two clevis joints, a clevis joint 231a, 232a, of the first shell 3a and a clevis joint 232b, respectively 231b, of the second shell 3b. Thus, not only is each clevis joint of the connecting rod 2 joined to the two shells 3a, 3b, but also the thickness of said clevis joints is augmented, which makes it possible to do away with the augmented matting forces in the fixing holes. When the thickness in line with the fixing holes is not sufficient to do away with the expected matting forces, advantageously the number of structural folds of the clevis joints of each shell is augmented locally.

When the forces to which the connecting rod is subjected do not require such a thickening of the clevis joints of the connecting rods, it is also possible to produce shells having a smaller number of clevis joints.

For example, a first shell 3a having only a single clevis joint 231a at one end and a second shell 3b having only a single clevis joint 231b at a corresponding end so that the clevis joints of the assembled shells constitute joints that are not doubled in thickness for the connecting rod, or for example a first shell 3a comprising two clevis joints 231a, 232a at one end and a second shell having no clevis joint at the corresponding end.

These examples, not illustrated in the drawings, do not limit the possible arrangement on the shells of the clevis joints or of other means of fixing the connecting rod.

According to the arrangement of the connecting rod 2 as has just been described, it is possible to separately produce the two shells 3a, 3b, intended to form said connecting rod, which is particularly useful when the connecting rod is produced in composite because the shells are of opened forms which are much simpler to produce than sealed forms, that is to say having a hollow internal volume as in the case of a conventional connecting rod or in the connecting rod 2 obtained after assembly of the shells.

Thus, to produce a connecting rod 2 in composite according to the invention, a first step consists in producing the shells 3a, 3b, whose geometry, adapted to the dimensions of the connecting rod, conforms to the shells described previously.

Such shells 3a, 3b, in composite, can be produced separately by using one of the various known methods for implementing composites, in particular by means of molds having forms and, possibly, counter-forms.

According to a first exemplary embodiment, each shell 3a, 3b is produced by the deposition of pre-impregnated fibers on a punch tool, for example a convex tool having the form of the concave portion of said shell. The pre-impregnated fibers can be deposited in different forms such as rovings, unidirectional sheets or even woven sheets.

When the pre-impregnated fibers have been deposited, according to the desired orientations and quantities, on the tool, the resin is, where appropriate, when the method implemented provides for this, hardened conventionally according to the known methods for producing parts made of composites, more often than not by hot polymerization under pressure.

According to a second exemplary embodiment, dry fibers are deposited according to the desired orientations and quantities to create a preform of dry fibers and then the preform is placed in a mold reproducing the volumes of the shell to be impregnated with a resin before the resin is hardened. In this case, the absence of a central core that cannot be removed from the mold makes it possible to implement the RTM resin transfer method in a conventional manner and with no particular difficulty.

According to a third exemplary embodiment, the shells are produced from a flat blank produced in thermo-formable composite, that is to say a composite having sufficient rigidity to be manipulated at ambient temperature but whose resin becomes plastically deform-able when its temperature is raised to a sufficient value, called plasticity temperature, by forming at the plasticity temperature by means of a matrix having the form of the shell and a punch or a bladder that applies the blank to the punch.

The blank can be produced in a composite whose resin is known for its plasticity properties when it is heated to a certain temperature, or else with a composite impregnated with a resin intended to harden by polymerization, or else with a composite impregnated with a resin intended to be hardened by polymerization but whose polymerization has been stopped before complete hardening so the material can retain thermoplastic characteristics during forming, after which the polymerization is continued to obtain the desired final hardening of the resin.

For each of these methods, the list of which is not limiting, the production of a shell of opened form makes it possible without difficulty for the fibers to be deposited according to conventional techniques or for the blanks to be produced so that said fibers are oriented optimally in relation to the forces provided for in the structure of the connecting rod.

When a shell is produced according to any production method, it is removed from the mold or extracted from the tool with which it was produced generally at a preform stage.

Said preform is then able to be subjected to finishing operations, in particular trimming operations which consists, if necessary, in adjusting the edges of the shells to the desired dimensions. In particular, the external forms of the clevis joints at the ends of the shell are produced, for example, by machining operations.

Advantageously, the openings in the clevis joints are not produced at this stage of production of the shell or only in the form of pilot holes to allow for the exact positioning of the shells relative to one another in the assembly operation, and allow an accurate drilling of the holes of the clevis joints, in diameter and in alignment, when the two shells 3a, 3b, of the connecting rod 2 have been assembled.

In a second step, the two shells 3a, 3b, whose dimensions are coordinated, advantageously, as already described, the two shells being geometrically substantially identical, are assembled to form the connecting rod 2.

The bearing surfaces between the two shells correspond to the surfaces 321a, 332b, 321b, 332a, defined by lengths over which the extensions 32a and 33b on the one hand and 32b, 33a on the other hand overlap conjugate with the length of the connecting rod 2 over which the overlap of said extensions extends. These surfaces are then determined in the design of the connecting rod by adjusting the lengths of overlap of the extensions, lengths that can be chosen to be greater or lesser within certain limits.

The bearing surfaces also comprise contact surfaces between the clevis joints produced at the ends of each shell. However, the overlaps of the clevis joints of the two shells prove advantageous essentially to thicken the clevis joints of the connecting rod by locally creating an over-thickness which improves the resistance of each clevis joint of the connecting rod 2 and by augmenting the matting surface of the hole of the clevis joint which favors a better structural behavior of the connecting rod.

Advantageously, this length of overlap, which the contact surface between the two shells 3a, 3b is chosen in order for the resistance of the assembly of said two shells to be adapted on the one hand to the forces that the connecting rod 2 must undergo and on the other hand to the method implemented to assemble said shells.

In a first exemplary assembly method, illustrated in FIG. 4b, of the two shells 3a, 3b, said two shells are glued by means of an adhesive 5 deposited on the contact surfaces 321a, 321b, 332a, 332b, of said shells previously hardened during a forming operation, then said shells are placed in contact to form the connecting rod 2 and held in position until the adhesive 5 ensures the assembly of the two shells.

In a second exemplary assembly method, illustrated in FIG. 4c, when the shells 3a, 3b are produced with a composite using fibers pre-impregnated with a resin that can harden by polymerization, said shells are placed, before complete hardening, in a tool then polymerized together, at least during a terminal resin polymerization phase, which enables said two shells to be assembled. Such a technique is generally designated co-baking in the production of assemblies of elements made of thermosetting composites.

In these exemplary assembly methods implementing gluing or co-baking techniques, it may prove necessary to exert a significant pressure between the surfaces that have to adhere 321a, 332b and 321b, 332a, which, because of the relative flexibility of the walls of the shells, necessitates holding the extensions 32a, 33b on the one hand and 32b, 33a on the other hand between clamping means.

Such clamping means consist, for example, of a rigid tool represent a hollow form of the connecting rod 2 in which said connecting rod is placed and a bladder that is placed in the hollow part of the connecting rod 2 then inflated to apply a pressure on the extensions of the shells whose form is guaranteed by the rigid tool.

In a third exemplary assembly method, applicable when the shells are produced with a thermoplastic material, the previously formed shells are assembled by thermo-plastic welding, for example by ultrasonic welding.

In a fourth exemplary assembly method, the previously hardened shells are assembled mechanically by means of fixings, for example rivets.

Other assembly methods capable of joining the two shells 3a, 3b can be used and in particular according to the composite technology used to produce said shells, combinations of the various exemplary assembly methods cited can be combined.

It is, however, noteworthy that the assembly zones determined by the contact surfaces between the shells 3a, 3b are subject to weak forces in the main direction of loading of the connecting rod 2, that is to say, in the direction of the axis 22 of the connecting rod, which possibly determines the choice of a preferred assembly method in particular cases.

In a third step, a machining of the clevis joints, in particular the drilling of the openings in the clevis joints, is carried out, together with any finishing operations.

The connecting rod according to the invention, and the method of producing such a connecting rod, is not limited to connecting rods obtained by means of two identical shells as described. Other forms can be produced according to the teaching of the invention. Thus, a connecting rod can be produced by an assembly of two shells of different sections such that one of the shells is embedded in the other shell.

In this case, the shells are assembled with two external bearing surfaces of one shell in contact with two internal bearing surfaces of the other shell as illustrated in FIG. 6.

A connecting rod according to the invention can also not have a substantially constant section as in the case described in detail, but, on the contrary, present a substantially straight section that changes, such as, for example, with a certain section at mid-distance from the ends of the connecting rod, the section decreasing more or less evenly toward the ends.

A connecting rod can also be produced by the assembly of several shells, three as illustrated in FIGS. 7a and 7b, or more, in order to use available production means or when the connecting rod, for example by its dimensions, proves simpler to produce in more than two shells.

In these cases, adaptations may prove necessary compared to the example described, without compromising the principles of the connecting rod and its production method.

The method can be applied to the production of a connecting rod in composite obtained by the assembly of two or more shells without clevis joint, means of fixing the connecting rod to the structure then being added and joined to the connecting rod after the production of the body of the connecting rod in accordance with the invention.

The connecting rod obtained and its method of manufacture offers numerous advantages including the possibility of producing a connecting rod in composite in a simplified manner compared to the known techniques and without requiring the implementation of complex and costly methods.

The invention claimed is:

1. A structural connecting rod of elongate form along an axis that is configured to transmit only tension and compression forces, the structural connecting rod comprising a first end, a second end and a hollow body having a closed cross section, the structural connecting rod comprising a composite material, the composite material comprising fibers held in a hardened resin, the first end of the structural connecting rod comprising a first pair of opposing clevis arms for fixing the structural connecting rod to a structure, the second end of the structural connecting rod comprising a second pair of opposing clevis arms for fixing the structural connecting rod to a structure, wherein said structural connecting rod comprises a first shell and a second shell assembled with the first shell, wherein:

each shell extends in the direction of the axis over a length equal to a length of the body of the structural connecting rod;

each shell has an opened U-shaped cross section with a concave internal face and a convex external face opposite the concave internal face;

each shell comprises a first bearing surface, on a first face of the shell, on a first extension of a longitudinal edge of the shell;

each shell comprises a second bearing surface, on a second face of the shell, on a second extension of a longitudinal edge of the shell, the second extension being opposite to the first extension over a straight section of the shell;

respective first and second ends of each of the first and second extensions of each of the first shell and second shell comprising a clevis arm longitudinally-extending from a substantially cylindrical central portion of the shell defining the hollow body, made of a composite material integral with said shell, and having a through hole;

the first shell being assembled with the second shell adjacent to the first shell so that:

the first bearing surface of the first shell, including a surface of one of the clevis arms of said first shell, is bearing on the second bearing surface of the second shell, including a surface of one of the clevis arms of said second shell, the two assembled shells forming the body of the structural connecting rod and creating a closed cross section; and the clevis arms of the first shell and the clevis arms of the second shell at each of the first and second ends of the shells being assembled with surface of said clevis arms in overlapping contact such that the through holes of the clevis arms at each of the first and second ends are aligned for receiving a clevis pin.

2. The structural connecting rod as claimed in claim 1, wherein the first bearing surface of each shell is situated on the external face of said shell, and wherein the second bearing surface of each shell is situated on the internal face of said shell.

3. The structural connecting rod as claimed in claim 2, wherein the shells are substantially identical.

4. The structural connecting rod as claimed in claim 1, wherein the resin of the composite material is a thermosetting resin hardened by polymerization.

5. The structural connecting rod as claimed claim 1, wherein the resin of the composite material is a thermoplastic resin hardened by cooling.

6. The structural connecting rod as claimed in claim 1, wherein the shells are secured by gluing.

7. A method of producing a structural connecting rod of elongate form along an axis, the structural connecting rod configured to transmit only tension and compression forces and comprising a first end, a second end and a hollow body having a cross section, the structural connecting rod comprising a composite material, the composite material comprising fibers held in a hardened resin, the first end of the structural connecting rod comprising a first pair of opposing clevis arms for fixing the structural connecting rod to a structure, the second end of the structural connecting rod comprising a second pair of opposing clevis arms for fixing the structural connecting rod to a structure, wherein said method comprises the steps of:
- A) producing a first shell and a second shell, each shell extending in the direction of the axis over a length equal to a length of the body of the connecting rod, each shell comprising:
  - an opened U-shaped cross section with a concave internal face and a convex external face opposite the concave internal face;
  - a first bearing surface on a first face on a first extension of a longitudinal edge; and
  - a second bearing surface on a second face on a second extension of a longitudinal edge, the second extension being opposite to the first extension over a straight section of the shell,
  - respective first and second ends of each of the first and second extensions of each of the first and second shells comprising a clevis arm longitudinally-extending from a substantially cylindrical central portion of the shell defining the hollow body, made of a composite material integral with said shell, and having a through hole; and
- B) assembling the first and second shells, with the first shell being assembled with the second shell so that:
  - the first bearing surface of the first shell is bearing on the second bearing surface of the second shell, the first and second shells forming the body of the structural connecting rod and creating a closed cross section; and
  - the clevis arms of the first shell and the clevis arms of the second shell at each of the first and second ends of the shells being assembled such that bearing surfaces of said clevis arms are in overlapping contact such that the through holes of the clevis arms at each of the first and second ends are aligned for receiving a clevis pin.

8. The method as claimed in claim 7, wherein the shells are produced by polymerization of fibers preimpregnated with a resin hardened by polymerization deposited in a mold, the form of which corresponds to the form of the shell to be produced.

9. The method as claimed in claim 7, wherein the shells are produced by polymerization of a resin hardened by polymerization after having been transferred into a preform of dry fibers deposited in a mold.

10. The method as claimed in claim 7, wherein the step of producing at least a first shell and a second shell comprises the steps of forming blanks from a composite material having thermoplastic properties and raising a temperature of the blanks.

11. The method as claimed in claim 10, wherein the shells are assembled by a thermoplastic welding method.

12. The method as claimed in claim 7, wherein the shells are assembled by gluing.

* * * * *

UNITED STATES PATENT AND TRADEMARK OFFICE
CERTIFICATE OF CORRECTION

PATENT NO.        : 8,672,574 B2
APPLICATION NO. : 12/666517
DATED             : March 18, 2014
INVENTOR(S)       : Cavallere et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 541 days.

Signed and Sealed this

Twenty-ninth Day of September, 2015

Michelle K. Lee
*Director of the United States Patent and Trademark Office*